Ohba et al.

(12) United States Patent
Ohba et al.

(10) Patent No.: US 7,578,556 B2
(45) Date of Patent: Aug. 25, 2009

(54) SEAT RECLINING APPARATUS

(75) Inventors: Mitsuharu Ohba, Kosai (JP); Akira Nemoto, Akishima (JP)

(73) Assignees: Fuji Kiko Co., Ltd. (JP); Tachi-S. Co., Ltd. (JP)

( * ) Notice: Subject to any disclaimer, the term of this patent is extended or adjusted under 35 U.S.C. 154(b) by 343 days.

(21) Appl. No.: 11/589,358

(22) Filed: Oct. 30, 2006

(65) Prior Publication Data
US 2007/0096530 A1 May 3, 2007

(30) Foreign Application Priority Data
Nov. 1, 2005 (JP) ............................. P2005-318668

(51) Int. Cl.
*B60N 2/02* (2006.01)
*B60N 2/00* (2006.01)
(52) U.S. Cl. .................. 297/366; 297/367; 297/378.12; 297/354.12
(58) Field of Classification Search ................. 297/366, 297/367, 378.12, 354.12
See application file for complete search history.

(56) References Cited

U.S. PATENT DOCUMENTS

| | | | | |
|---|---|---|---|---|
| 6,106,067 | A * | 8/2000 | Zhuang et al. | 297/361.1 |
| 6,296,311 | B1 * | 10/2001 | Bonk et al. | 297/367 |
| 6,648,414 | B2 * | 11/2003 | Ikegaya et al. | 297/367 |
| 6,666,515 | B2 * | 12/2003 | Asano et al. | 297/366 |
| 6,739,668 | B2 * | 5/2004 | Coman et al. | 297/378.12 |
| 6,986,551 | B2 * | 1/2006 | Ohba | 297/341 |
| 7,021,716 | B2 * | 4/2006 | Persad et al. | 297/378.12 |
| 7,255,398 | B2 * | 8/2007 | Tokui et al. | 297/367 |
| 2006/0091712 | A1 * | 5/2006 | Tokui et al. | 297/367 |

FOREIGN PATENT DOCUMENTS

| | | | |
|---|---|---|---|
| EP | 1652721 A2 * | 5/2006 | |
| JP | 07-301722 | 11/1995 | |
| JP | 08-182558 | 7/1996 | |
| JP | 2000-338358 | 12/2000 | |
| JP | 2003516834 T | 5/2003 | |
| JP | 2004121508 | 4/2004 | |

* cited by examiner

*Primary Examiner*—Rodney B White
*Assistant Examiner*—Erika Garrett
(74) *Attorney, Agent, or Firm*—Kilpatrick Stockton LLP

(57) ABSTRACT

A seat reclining apparatus includes a folding operation lever displacing a reclining lock mechanism to a lock release position. When the folding operation lever is operated to a folding operation position, the reclining lock mechanism is displaced from a lock position to the lock release position. A seatback is displaced to a folded position by a biasing force of a folding biasing unit. A neutral position returning unit that retains a releasing lever disposed between the folding operation lever and the reclining lock mechanism when the seatback is inclined forward beyond a predetermined neutral position, and does not retain the releasing lever when the seatback is inclined rearward beyond the neutral position is further provided. A configuration for returning the seatback to the neutral position can be provided by a simple structure and only a slight design change at a lower production cost, and assembling is performed simply.

5 Claims, 13 Drawing Sheets

SEAT RECLINING APPARATUS

BACKGROUND OF THE INVENTION

1. Field of the Invention

The present invention relates to a seat reclining apparatus that can recline a seatback to a seat cushion, and can lock the seatback at a desired position.

2. Description of Related Art

One of the above kinds of seat reclining apparatuses has been proposed in Japanese Patent Application Laid-open No. 2004-121508.

Seat reclining apparatuses 100 are provided on both left and right sides of a rear portion of a seat cushion (not shown), respectively. As shown in FIG. 1, the seat reclining apparatuses 100 have a pair of base brackets 101 fixed at the both left and right ends of the seat cushion, and a pair of arm brackets 102 fixed at both left and right ends of a seatback. Reclining lock mechanisms 110 are provided between the left and right base brackets 101 and the left and right arm brackets 102, respectively. Thereby, each arm bracket 102 is supported to each base bracket 101 rotatably around a center shaft 103. The center shafts 103 are connected by a connection pipe 103a, and both the center shafts 103 rotate integrally.

A spiral spring 104 is disposed outside the center shaft 103. One end of the spiral spring 104 is fixed to the base bracket 101 of the seat cushion, and the other end thereof is fixed to the arm bracket 102 of the seatback. The seatback is biased to a folded position by a spring force of the spiral spring 104.

As shown in FIG. 2 and FIG. 3, the reclining lock mechanism 110 includes a base circular case 111, an arm circular case 112, a pair of lock teeth 114, 114, a cam plate 115, and a pair of lock springs 116, 116. The circular case 111 is fixed to the base bracket 101. The arm circular case 112 is fixed to the arm bracket 102, and an inner peripheral gear 113 is formed on an inner periphery of the arm circular case 112. Each lock tooth 114, 114 is accommodated in a space formed by the both circular cases 111, 112 near the outer periphery of the space. The cam plate 115 is accommodated in the center of the space formed by both the circular cases 111, 112, and is fitted with the center shaft 103. Each lock spring 116, 116 biases the cam plate 115 in a counterclockwise direction (to a lock position side) in FIG. 2. The lock teeth 114, 114 are respectively supported swingably about fulcrums 114a, and outer peripheral gears 117, 117 are formed on outer peripheries of the lock teeth 114, 114, respectively.

A reclining operation lever 120 (shown in FIG. 1) or a folding operation lever (not shown) is attached directly or via a connection member on one portion of the center shaft 103 projected from the reclining lock mechanism 110. By operating the operation lever 120 or the like, a lock by the reclining lock mechanism 110 can be released.

In this configuration, in the reclining lock mechanism 110, the outer peripheral gears 117, 117 of the lock teeth 114, 114 are engaged with the inner peripheral gears 113, 113 of the arm circular case 112 by spring forces of the lock springs 116, 116. Thereby, the seatback is locked to the seat cushion. When a user operates the reclining operation lever 120 to rotate the center shaft 103 in a clockwise direction in FIG. 2 against the spring forces of the lock springs 116, 116, the inner peripheral gears 113, 113 and the outer peripheral gears 117, 117 are disengaged from each other so that the lock is released. When the lock is released, the seatback is folded to the folded position by the spring force of the spiral spring 104. When the user's hand is released from the reclining operation lever 120, the lock teeth 114, 114 are biased to lock positions by the spring forces of the lock springs 116, 116, but the lock teeth 114 are pressed against inner peripheral toothless portions 113a formed to be continuous to the inner peripheral gears 113, so that the seatback is not locked.

When the user pulls up the seatback against the spring force of the spiral spring 104 in order to return the seatback positioned at the folded position to a desired reclining position, the lock teeth 114, 114 are slid and moved on the inner peripheral toothless portions 113a, 113a, and the seatback is locked at a position where the inner peripheral gears 113, 113 and the outer peripheral gears 117, 117 are first engaged with each other.

When the seatback at the folded position is returned into a reclining range in this manner, the seatback is locked at a foremost position in the reclining range. Since the foremost position is set such that the seatback is put in an upright state rather than a position where seatback is ordinarily used, the user is required to operate the reclining operation lever 120 again to release the lock in the reclining lock mechanism 110, and to set the seatback to a desired reclining position. Therefore, returning the seatback positioned at the folded position to a predetermined reclining position is troublesome, and such an operation is inconvenient.

Therefore, there has been proposed a seat reclining apparatus in which a full memory unit that stores a reclining position of a seatback just before being folded is provided, so that, when the seatback positioned at a folded position is pulled up in order to return the same into a reclining range, the seatback is returned to the previous reclining position owing to the full memory unit (see Japanese Patent Application Laid-open No. 2003-516834). Such a seat reclining apparatus has also been proposed that another lock mechanism is provided in addition to a reclining lock mechanism, so that, when a seatback positioned at a folded position is pulled up to a reclining range, the seatback is returned to a predetermined reclining position by the another lock mechanism (see Japanese Patent Application Laid-open No. H8-182558).

SUMMARY OF THE INVENTION

However, in the seat reclining apparatus including the full memory unit, since such a configuration is required that all reclining positions can be stored, there are problems such that a configuration is complicated, and a production cost thereof is high. Since the full memory unit is provided inside the reclining lock mechanism, a significant change in design is required, and there is a problem that the full memory unit cannot be additionally provided in an existing seat reclining apparatus. In a case of folding a seatback positioned at a flat position, when the seatback is pulled up in order to return the same into the reclining range, the seatback is not locked until it reaches the flat position, which results in inconvenience for use.

In the seat reclining apparatus including the another lock mechanism, since it is required to add a lock mechanism separately from an existing reclining lock mechanism, there are problems of a complex configuration and a high production cost like the former case. Since another lock mechanism is applied with a load from the seatback, strength sustainable for the load is required for the another lock mechanism, and strength management or the like is also required for the another lock mechanism.

The present invention has been achieved in order to solve the above problems, and an object of the invention is to provide a seat reclining apparatus that can return a seatback from a folded position to a predetermined neutral position, and its configuration is simple, the production cost thereof is lower, can be provided by only a slight design change, is easy to use, its strength management with respect to a load from the seatback or the like is reduced, and has a favorable assembly performance.

A seat reclining apparatus according to the present invention includes a folding biasing unit, a reclining lock mechanism, and a folding operation lever. The folding biasing unit supports a seatback so as to be capable of reclining to a seat cushion, and biases the seatback to a folded position. The reclining lock mechanism is displaced between a lock position where the seatback is locked at an arbitrary position within a reclining range and a lock release position where lock of the seatback is released, and exerts a lock biasing force at the lock position. The folding operation lever displaces the reclining lock mechanism to the lock release position. When the folding operation lever is operated to the folding operation position, the reclining lock mechanism is displaced from the lock position to the lock release position, so that the seatback is displaced to the folded position by a biasing force of the folding biasing unit. The seat reclining apparatus according to the present invention further includes a neutral position returning unit that retains a releasing lever disposed between the folding operation lever operated to the folding operation position and the reclining lock mechanism at the lock release position when the seatback is positioned on a folding side beyond a predetermined neutral position set within the reclining range, and allows movement of the releasing lever to the lock position when the seatback is positioned on a rearward inclining side beyond the neutral position. The neutral position returning unit and the releasing lever are united as a seat memory unit.

According to the present invention, since the neutral position returning unit retains or does not retain a displacing position of the releasing lever, a simple configuration and a low production cost can be achieved. Since the neutral position returning unit retains or does not retain a position of the releasing lever disposed between the reclining lock mechanism and the folding operation lever, the neutral position returning unit can be provided outside the reclining lock mechanism, can be provided by a slight design change, and can be easily additionally provided to an existing seat reclining apparatus.

When the seatback is returned to a reclining position, the seatback is returned to a predetermined neutral position regardless of a position of the seatback just before being folded, which results in convenience for use. When the seatback is returned from the folded position to the reclining range, a load from the seatback is received by the reclining lock mechanism, so that its strength management or the like can be reduced.

Since the neutral position returning unit is formed as a seat memory unit, assembling of the unit to a seat reclining apparatus is made easier.

It is preferable that the seat memory unit includes a cylindrical collar, a releasing lever, a folding link lever, a cam plate, a cam biasing unit, and a cam releasing unit.

The cylindrical collar is rotatably supported on a unit fixing base fixed to the seat cushion and is fitted with a shaft which displaces the reclining lock mechanism between the lock position and the lock release position to rotate integrally therewith. The releasing lever is fixed on the cylindrical collar to rotate integrally. The folding link lever is rotatably supported to the unit fixing base, is moved together with the folding operation lever provided to the upper portion of the seatback, is displaced from a standby position to a lever rotating position against a biasing force of the lever biasing unit when the folding operation lever is operated from a standby position to a folding operation position, and rotates the releasing lever together in the displacement course to displace the reclining lock mechanism from the lock position to the lock release position. The cam plate is rotatably supported on the unit fixing base, and can be displaced between a lever rotation allowable position where a rotation of the folding link lever is allowed and a lever rotation blocking position where a rotation of the folding link lever is blocked when the folding link lever is positioned at a lever rotating position. The cam biasing unit biases the cam plate to the lever rotation blocking position. The cam releasing unit displaces the cam plate from the lever rotation blocking position to the lever rotation allowable position against a biasing force of the cam biasing unit when the seatback is displaced from the folded position to the predetermined neutral position, and retains the cam plate at the lever rotation allowable position when the seatback is positioned on the rearward inclining side beyond the neutral position.

Thus, since the neutral position returning unit can include the releasing lever, the folding link lever, the lever biasing unit, the cam plate, the cam biasing unit, and the cam releasing unit, it can be achieved with a small number of parts.

The releasing lever is fixed on the cylindrical collar rotatably supporting the unit fixing base, and the cylindrical collar is fitted on the shaft to be capable of rotating integrally. Therefore, it is unnecessary to provide the releasing lever to the shaft at an assembly step, so that an assembling performance is favorable.

It is preferable that the folding link lever is rotatably supported on the outer peripheral face of the cylindrical collar, and the shaft and the releasing lever are supported so as to rotate independently.

Thus, the releasing lever and the folding link lever can be disposed on the cylindrical collar, so that a configuration of the seat memory unit can be made compact by a high-density disposition of parts.

Furthermore, it is preferable that the cylindrical collar and the shaft inserted into the cylindrical collar can rotate integrally by deformation-fitting or serration-fitting.

Thus, it is made possible to rotate the releasing lever and the shaft integrally by only fitting the cylindrical collar on the shaft, and positioning of the cylindrical collar and the shaft at insertion time is made easier, so that an assembling easiness can be improved.

Further, it is preferable that the reclining lock mechanisms are disposed on both left and right sides of the seat cushion, and the shafts of both reclining the lock mechanisms are connected by a connection member, and an end portion of the shaft projected from one end face of the cylindrical collar and the cylindrical collar are fixed to one end of the connection member by welding, respectively.

Therefore, the releasing lever, the shaft, and the connection member can be rotated integrally without any play. Since a welding work with respect to the shaft can be performed simultaneously when the connection member and the shaft are connected, an assembling easiness can be improved.

Further, it is preferable that the seat memory unit includes the unit fixing base fixed to the seat cushion, a unit movable base fixed to the seatback, and a cylindrical collar which is inserted with the shaft and is rotated integrally with the shaft. It is preferable that the releasing lever is fixed on the cylindrical collar, the folding link lever is rotatably supported on the cylindrical collar, the cam plate is rotatably supported on the unit fixing base, and a cam releasing wall which displaces or retains the cam plate is provided on the unit movable base.

Thus, the seat memory unit can be assembled by inserting the shaft into the cylindrical collar, fixing unit fixing base and fixing the unit movable base to the seat back.

DETAILED DESCRIPTION OF THE INVENTION

An embodiment of the present invention will be explained below in detail with reference to the accompanying drawings.

Figure 4:
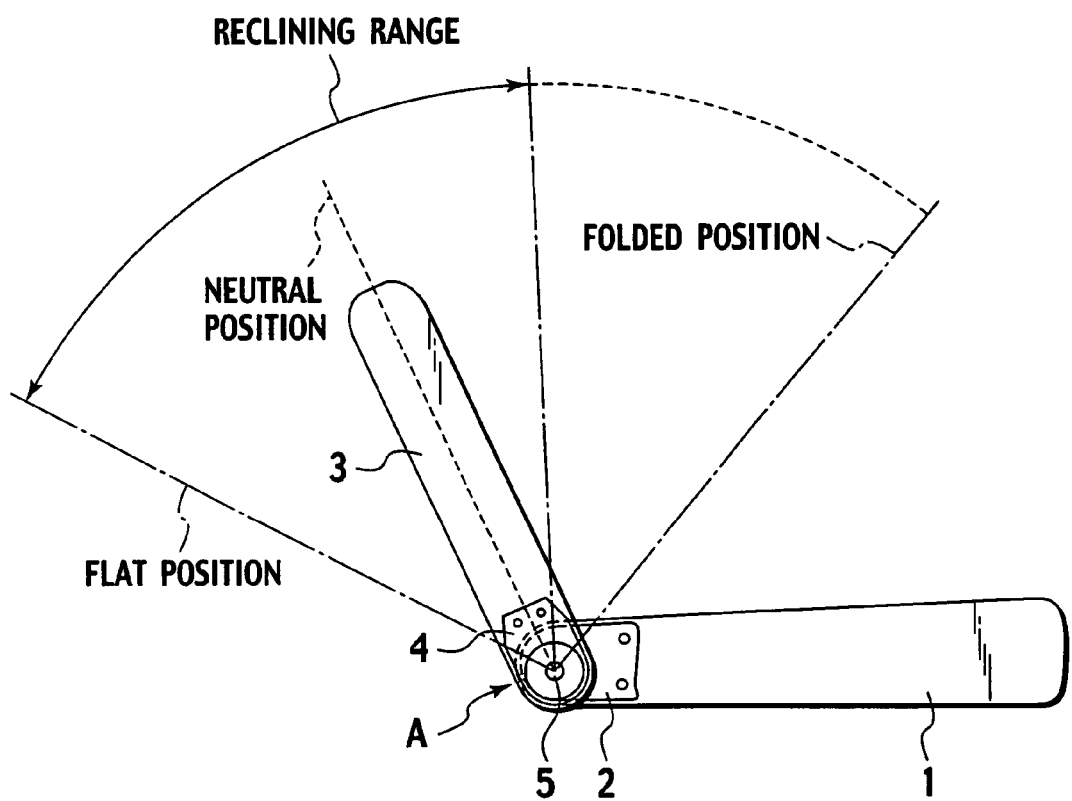
FIG. 4 is a side view showing a rotation range and each rotating position of a seatback according to an embodiment of the present invention.

As shown in FIG. 4, seat reclining apparatuses A are provided on both left and right sides of a rear portion of a seat cushion 1, respectively. In FIG. 4, one of the left and right seat reclining apparatuses A provided in pairs is shown. The seat reclining apparatuses A have a pair of base brackets 2 fixed at both the left and right ends of the seat cushion 1, and a pair of arm brackets 4 fixed at both left and right ends of the seatback 3. A reclining mechanism 7 (shown in FIG. 5 and the like) is disposed between the base bracket 2 and the arm bracket 4. The pair of arm brackets are supported to the pair of base brackets 4 rotatably around respective center shafts 5. The left and right center shafts 5 provided in pairs are connected via a link rod 5A (shown in FIG. 5 and the like) serving as a shaft connection member. Such a configuration allows the seatback 3 to be supported so as to be capable of reclining to the seat cushion 1 between a foremost inclined folded position and a rearmost inclined flat position in a reclining range, as shown in FIG. 4.

Figure 5:
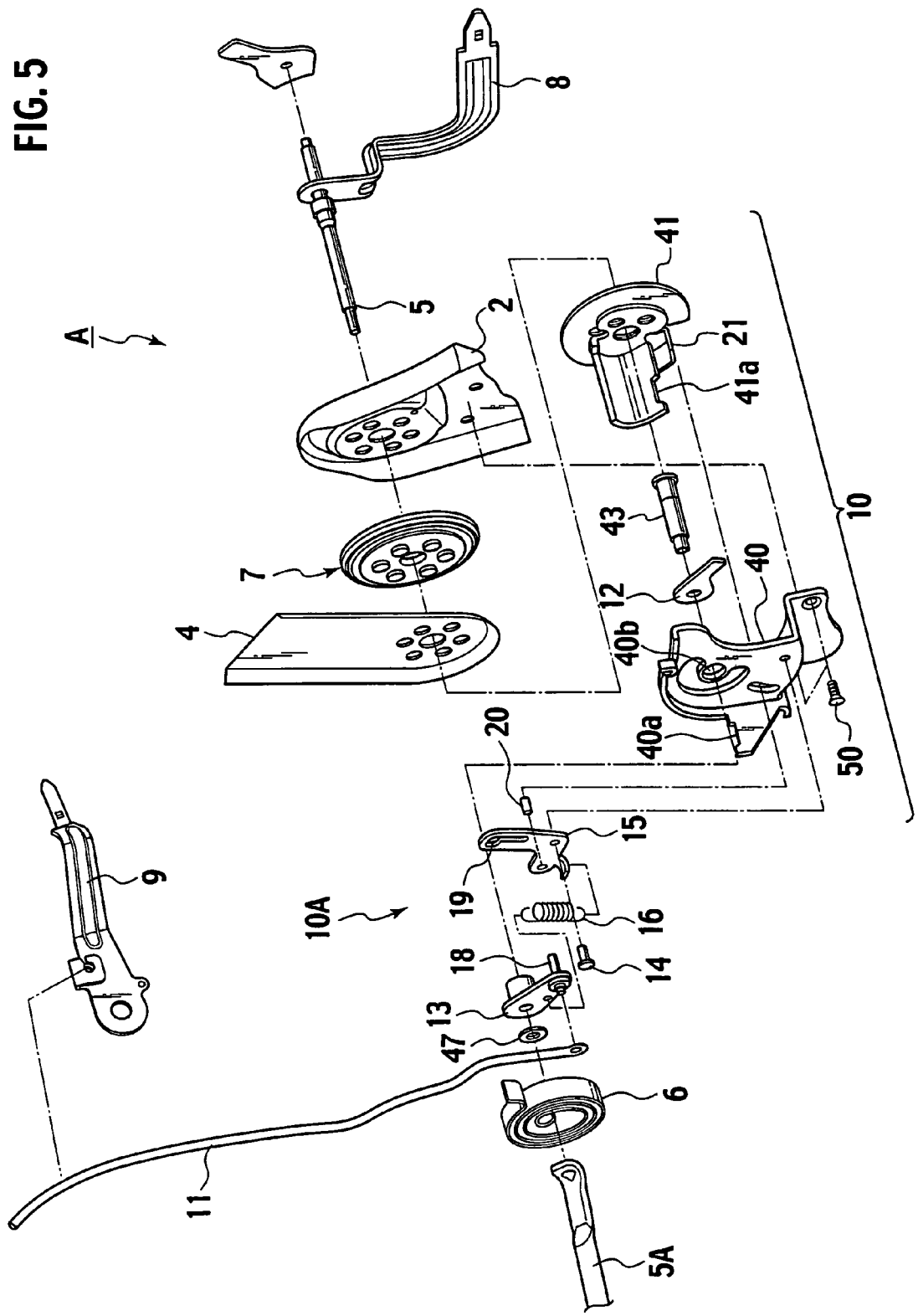
FIG. 5 is an exploded perspective view of a seat reclining apparatus according to the embodiment.

As shown in FIG. 5, the seat reclining apparatus A has a spiral spring 6, a pair of left and right reclining lock mechanism 7, a folding operation lever 9, and a seat memory unit 10. The spiral spring 6 is a folding biasing unit that biases the seatback 3 to the folded position. The reclining lock mechanism 7 locks the seatback 3 in the reclining range behind the folded position against a biasing force of the spiral spring 6. A reclining operation lever 8 and the folding operation lever 9 release the lock maintained by the reclining lock mechanism 7. The seat memory unit 10 retains the reclining lock mechanism 7 at a lock release position until the seatback 3 folded due to an operation of the folding operation lever 9 is pulled up to a predetermined neutral position, and returns the reclining lock mechanism 7 to a lock position when the seatback 3 is pulled up to the neutral position.

The neutral position is set to a design reference position within the reclining range, or an arbitrary position inclining at a predetermined angle forward and rearward from the design reference position.

The spiral spring 6 which is a folding biasing unit is disposed around the center shaft 5. One end (outer end) of the spiral spring 6 is hooked at a retaining portion 40a of a unit fixing base 40 of the seat memory unit 10, the other end (inner end) thereof is hooked at a retaining portion 41a of a unit movable base 41 of the seat memory unit 10. The seatback 3 is biased to the folded position by a spring force of the spiral spring 6.

Figure 1:
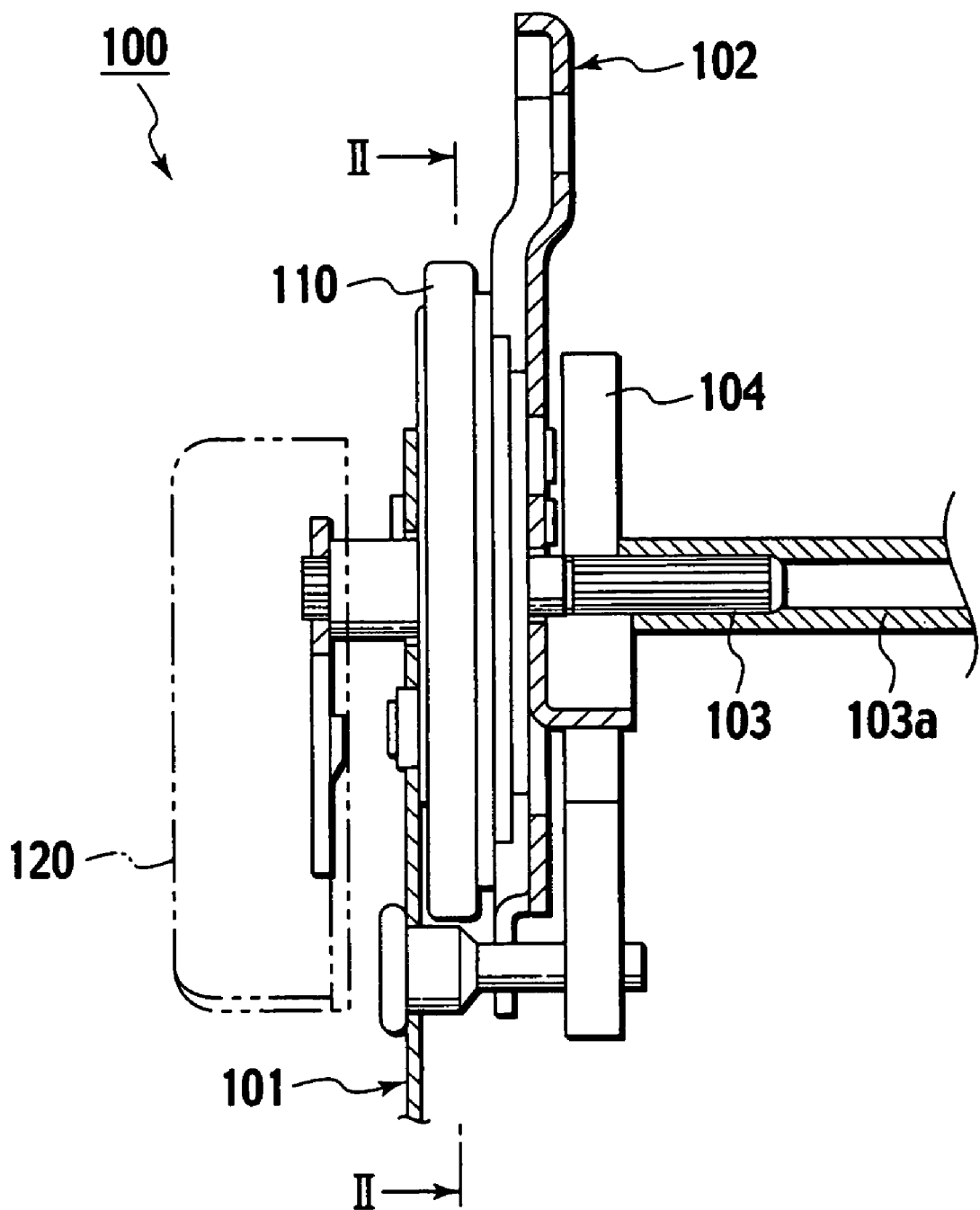
FIG. 1 is a side view of a conventional seat reclining apparatus.
Figure 2:
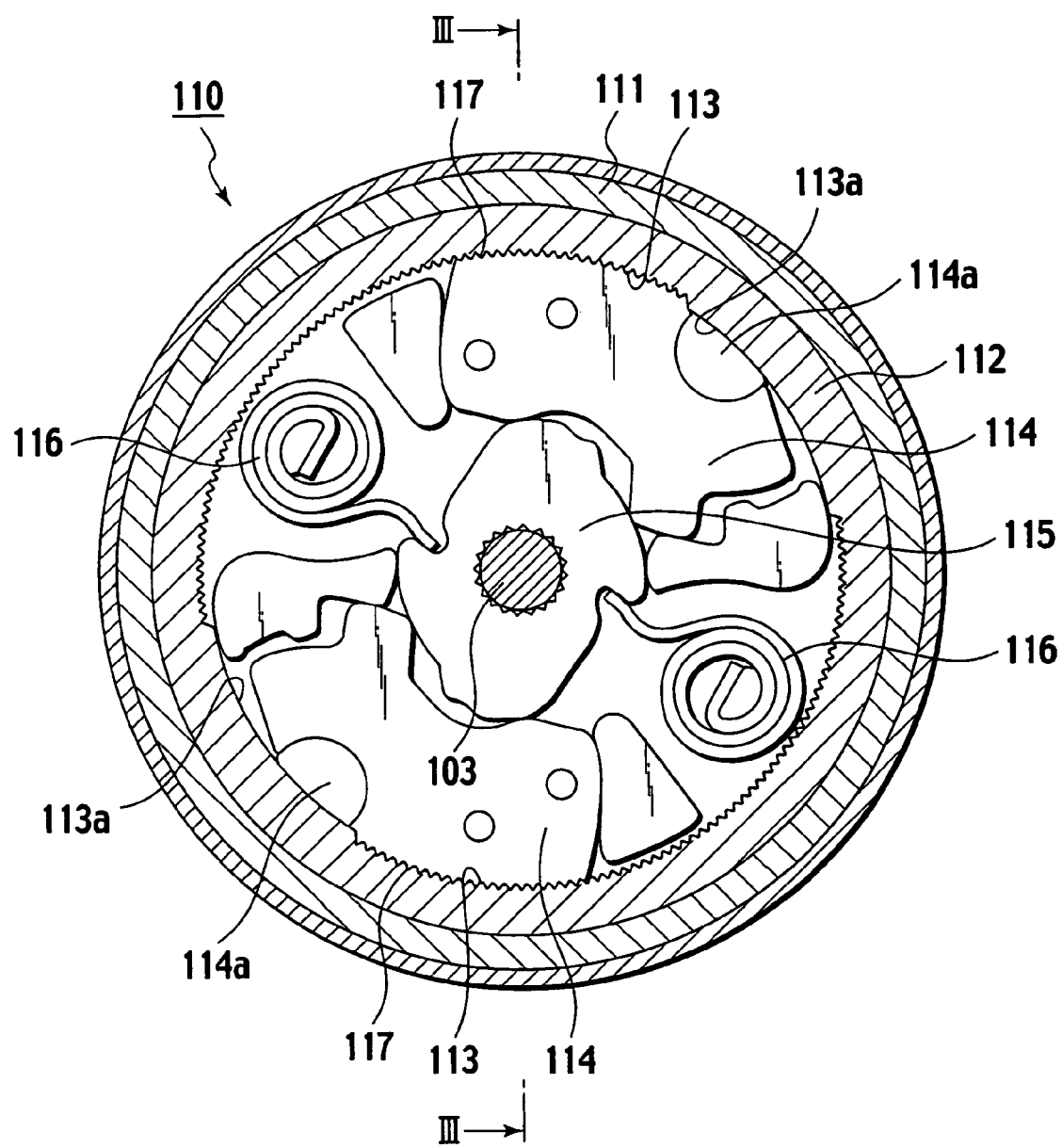
FIG. 2 is a sectional view taken along a line II-II in FIG. 1.
Figure 3:
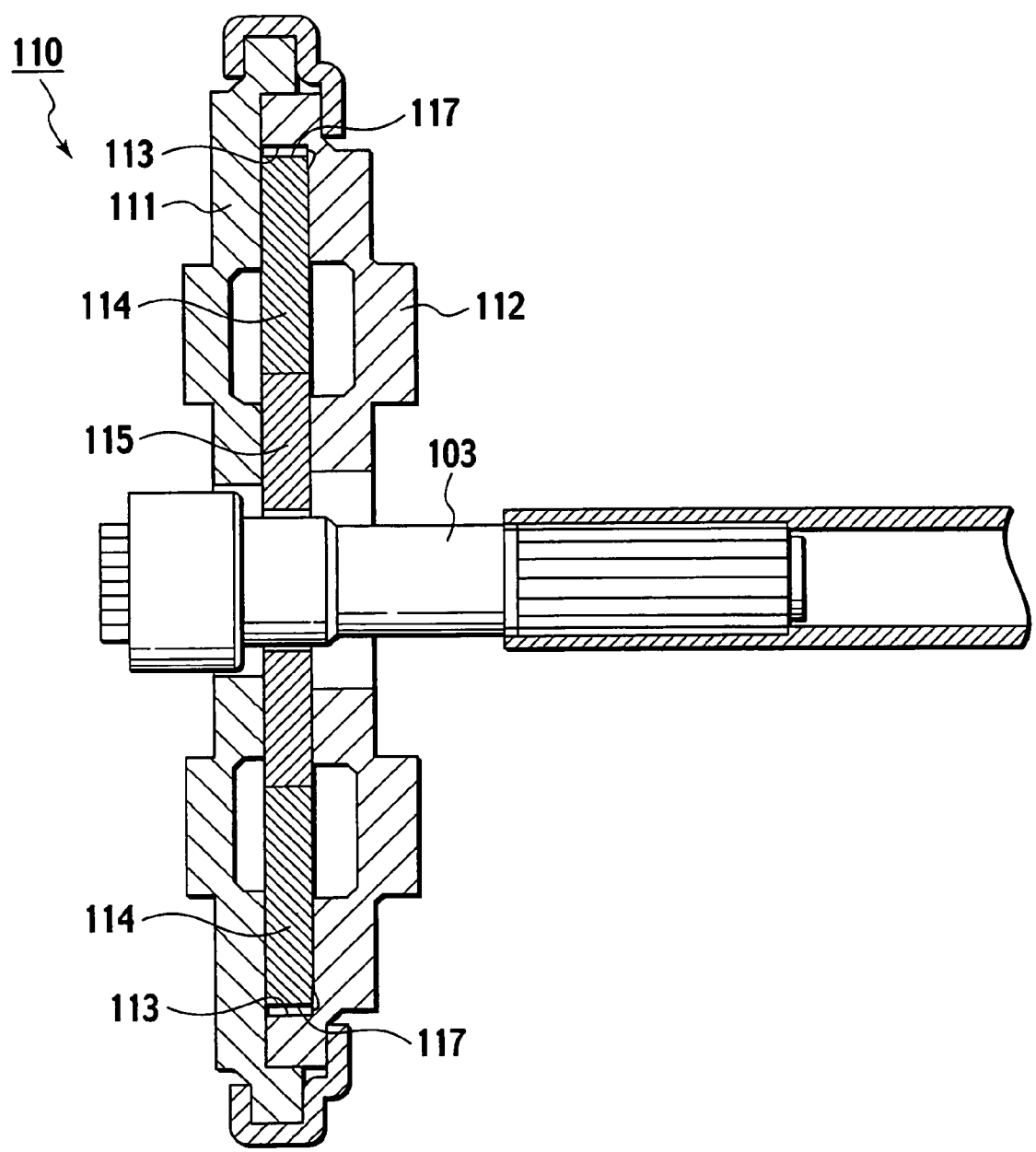
FIG. 3 is a sectional view taken along a line III-III in FIG. 2.

The pair of the reclining lock mechanisms 7 are disposed between the left and right base brackets 2 and the left and right arm brackets 4, respectively. Since the configuration of each reclining lock mechanism 7 is similar to that of the explained conventional example, detailed explanation thereof is omitted (see FIG. 2 and FIG. 3). Briefly explaining, each reclining lock mechanism 7 locks the seatback 3 at the lock position in the reclining range by causing an inner peripheral gear and an outer peripheral gear to mesh with each other by biasing forces of lock springs inside the reclining lock mechanism 7. The lock can be then released by separating the inner peripheral gear and the outer peripheral gear from each other by a rotation of the center shaft 5.

The reclining operation lever 8 is fixed on the center shaft 5 projecting from the reclining lock mechanism 7. When the reclining operation lever 8 is pivoted, the center shaft 5 is rotated to release the lock maintained by the reclining lock mechanism 7.

The folding operation lever 9 is attached to an upper portion of the seatback 3, and can rotate the center shaft 5 via a cable for folding 11, a folding link lever 13, a releasing lever 12, and a cylindrical collar 43.

In the present embodiment, the seat memory unit 10 is attached to only one of the pair of left and right reclining lock mechanisms 7. As shown in FIG. 5 to FIG. 8, the seat memory unit 10 includes the unit fixing base 40, the unit movable base 41, the cylindrical collar 43, the releasing lever 12, and a neutral position returning unit 10A. The unit fixing base 40 is fixed on the base bracket 2. The unit movable base 41 is fixed on the 30 arm bracket 4, and is rotated integrally with the arm bracket 4. The cylindrical collar 43 is rotatably inserted into an axis hole 40b of the unit fixing base 40, and the center shaft 5 is inserted into the cylindrical collar 43. The releasing lever 12 is fixed on the cylindrical collar 43. The neutral position returning unit 10A retains the releasing lever 12 operated to a folding operation position at the lock release position when the seatback 3 is folded beyond the predetermined neutral position set within the reclining range. The neutral position returning unit 10A does not retain the releasing lever 12 at the lock release position when the seatback 3 is positioned on the flat side beyond the neutral position.

The unit fixing base 40 is fixed on the base bracket 2 by a connection screw 50. The unit movable base 41 is fixed on the arm bracket 4 by welding both faces of the unit movable base 41 and the arm bracket 4. The cylindrical collar 43 is deformation-fitted to the center shaft 5 and is inserted with the center shaft 5 so as to be capable of rotating integrally. The cylindrical collar 43 and the center shaft 5 can be fitted to each other using serration.

Figure 6:
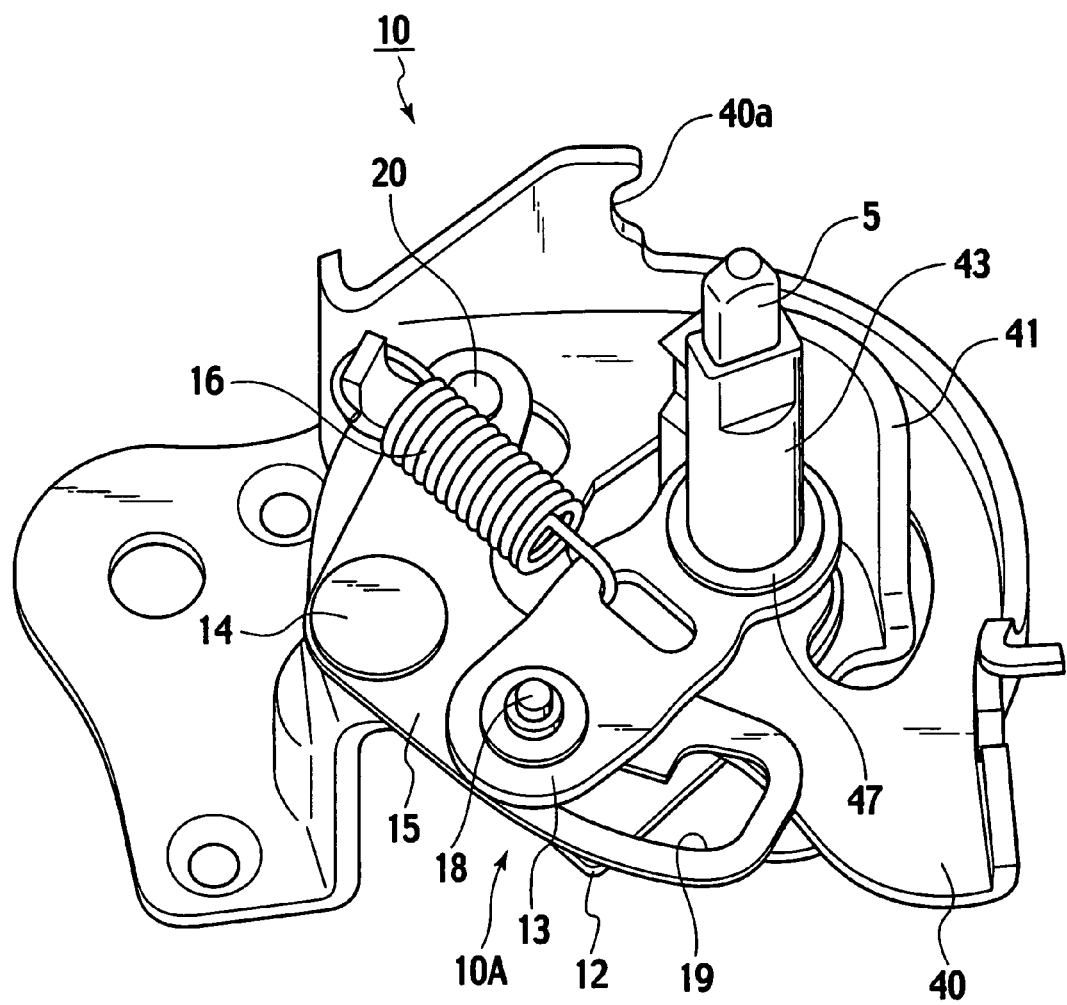
FIG. 6 is a perspective view of a seat memory unit according to the embodiment.

As shown in FIG. 6, the neutral position returning unit 10A includes a folding link lever 13, an L-shaped cam plate 15, a tension coil spring 16, and a cam releasing unit 17 (see FIG.

Figure 13:
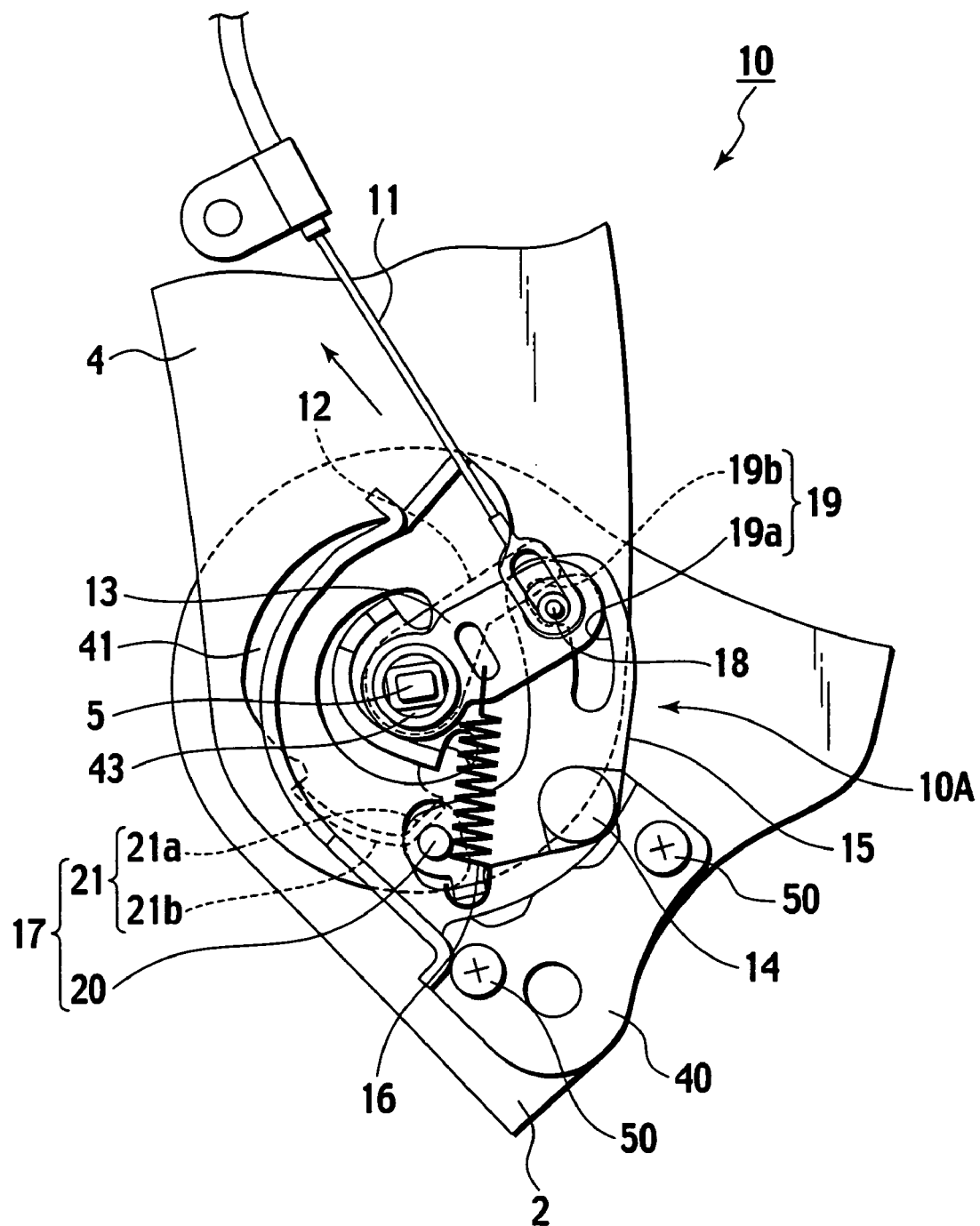
FIG. 13 is still another sectional view for explaining the operation of returning to the neutral position according to the embodiment.

9 to FIG. 13). The folding link lever 13 is rotatably inserted in the cylindrical collar 43, and is hooked on the releasing lever 12 fixed on the cylindrical collar 43 to be capable of rotating integrally with the releasing lever 12. The cam plate 15 is supported on the unit fixing base 40 rotatably around an axial pin 14. The tension coil spring 16 is a spring hooked between the cam plate 15 and folding link lever 13. The neutral position returning unit 10A includes the cam releasing unit 17 which displaces or retains a position of the cam plate.

Figure 7:
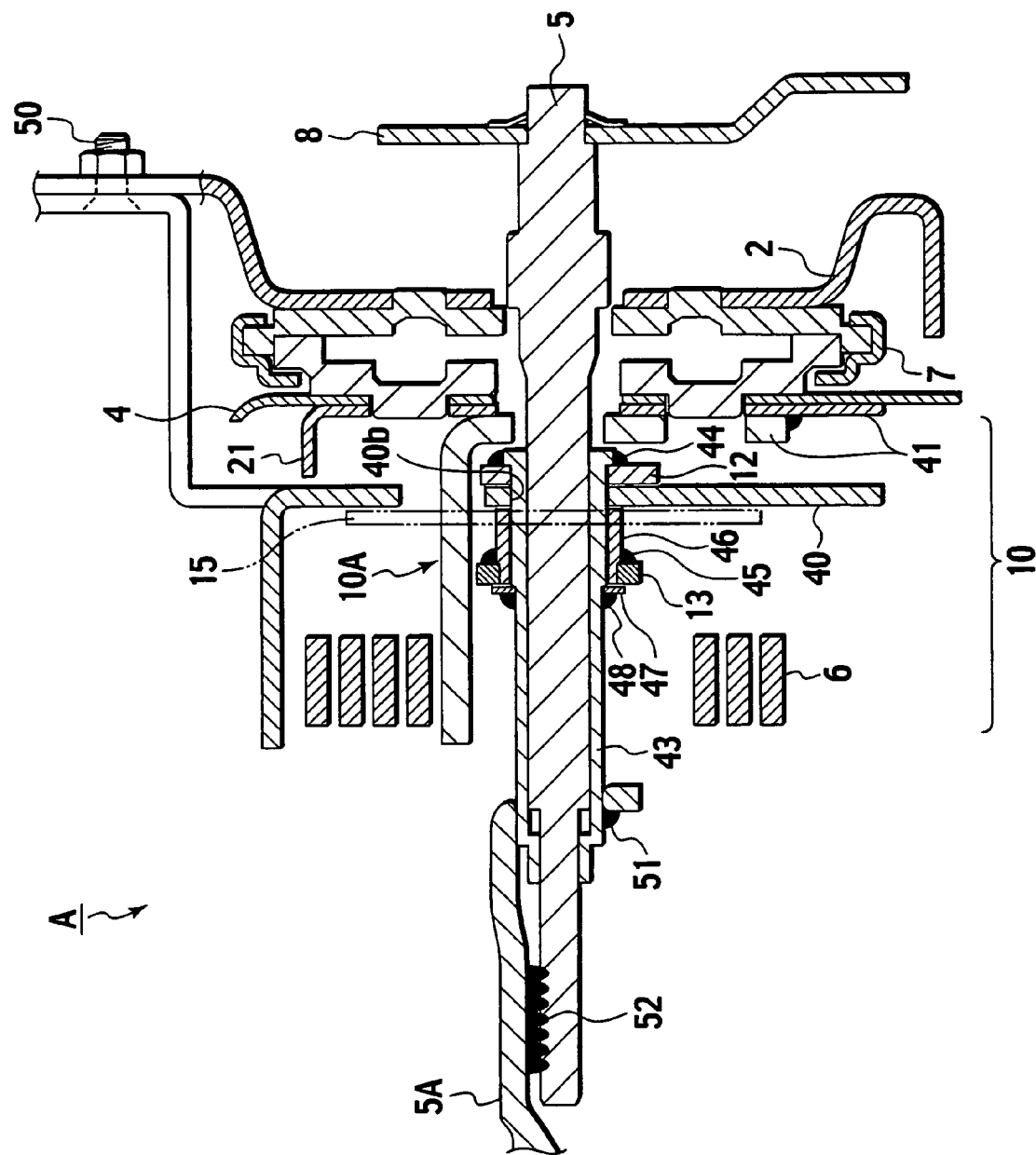
FIG. 7 is a sectional view of the seat reclining apparatus according to the embodiment.
Figure 8:
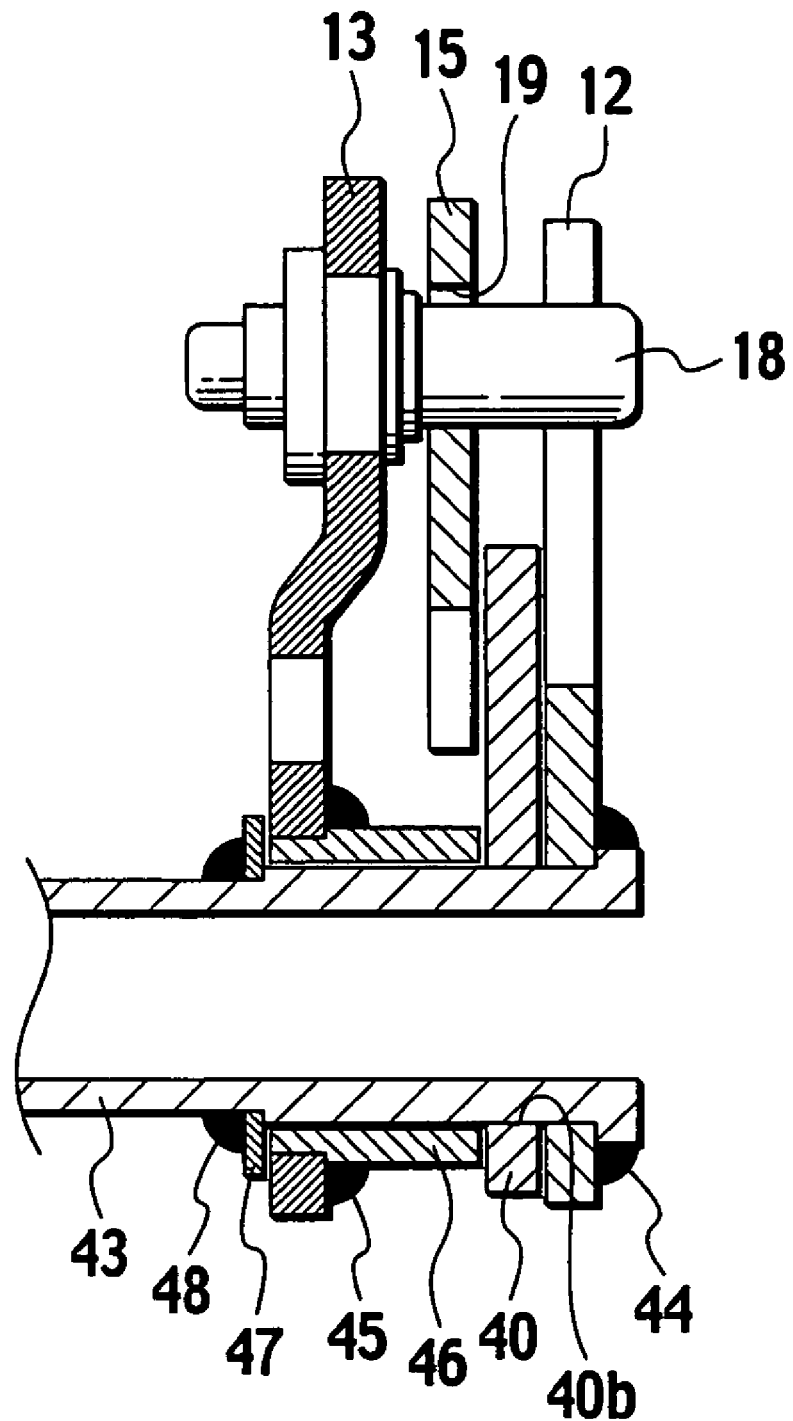
FIG. 8 is a sectional view of relevant parts of the seat memory unit according to the embodiment.

As shown in FIG. 7 and FIG. 8, the releasing lever 12 is fixed on the cylindrical collar 43 by a welding portion 44, to rotate integrally with the center shaft 5 and the cylindrical collar 43. The free end side of the releasing lever 12 is positioned on a rotary locus of a pin 18 erectly provided on the free end side of the folding link lever 13.

The folding link lever 13 has a swinging central collar 46 fixed by the welding portion 45. The swinging central collar 46 is loosely fitted on the cylindrical collar 43, and the link lever 13 is supported rotatably around the center shaft 5. The swinging central collar 46 is restricted in its movement in an axial direction by restricting one end of the swinging central collar 46 by the unit fixing base 40 and the other end thereof by a washer 47, respectively. The washer 47 is fixed on the cylindrical collar 43 by the welding portion 48. The washer 47 can be fixed by a push nut or the like, instead of welding.

The pin 18 of the folding link lever 13 is inserted into an approximately L-shaped pin inserting slit 19 formed near one free end of the cam plate 15. The pin 18 is attached with a lower end of the cable for folding 11. An upper end of the cable for folding 11 is attached to the folding operation lever 9. When the folding operation lever 9 is operated from a standby position to a folding operation position, the folding link lever 13 is displaced from the standby position (a position in FIG. 9) to a lever rotating position (a position in FIG. 10) where the releasing lever 12 is rotated. The releasing lever 12 is integrally rotated due to this displacement to release the lock maintained by the reclining lock mechanism 7.

The cam plate 15 has the pin inserting slit 19 near the one free end described above. The pin inserting slit 19 includes an arc-shaped guide slit 19a and a retaining slit 19b. The guide slit 19a is formed along the rotary locus of the pin 18 of the folding link lever 13. The retaining slit 19b is continued to a terminal end of the guide slit 19a to be formed in a direction approximately orthogonal to the guide slit 19a. The pin 18 is inserted in the pin inserting slit 19, as described above. When the pin 18 is positioned at a terminal end of the guide slit 19a, the cam plate 15 is swingable between a lever rotation allowable position (a position in FIG. 10, where the pin 18 is positioned in the guide slit 19a) and a lever rotation blocking position (a position in FIG. 11, where the pin 18 comes into the back of the retaining slit 19b). The cam plate 15 has a pin 20 of the cam releasing unit 17 near the other free end. One end of the tension coil spring 16 is retained at the other free end of the cam plate 15. The pin 20 will be described later.

The tension coil spring 16 biases the cam plate 15 to the lever rotation blocking position and biases the folding link lever 13 to the standby position. That is, in the present embodiment, the tension coil spring 16 serves as both a lever biasing unit biasing the folding link lever 13 to the standby position and a cam biasing unit biasing the cam plate 15 to the lever rotation blocking position.

The cam releasing unit 17 includes the pin 20 erectly provided to the cam plate 15, and a cam releasing wall 21 (see FIG. 5 and FIG. 9 to FIG. 13) provided integrally on the unit movable base 41. The cam releasing wall 21 includes an inclined wall portion 21a and an arc-shaped wall portion 21b provided continuously to the inclined wall portion 21a When the cam plate 15 is positioned at the lever rotation blocking position, by raising the seatback 3 from the folded position to the predetermined neutral position, the pin 20 is pressed by the inclined wall portion 21a of the cam releasing wall 21 to return the cam plate 15 from the lever rotation blocking position to the lever rotation allowable position. When the seatback 3 is positioned on the flat position side beyond the neutral position in the reclining range, by operating the folding operation lever 9 to the folding operation position, the arc-shaped wall portion 21b is brought in contact with the pin 20 to retain the cam plate 15 at the lever rotation allowable position.

Figure 9:
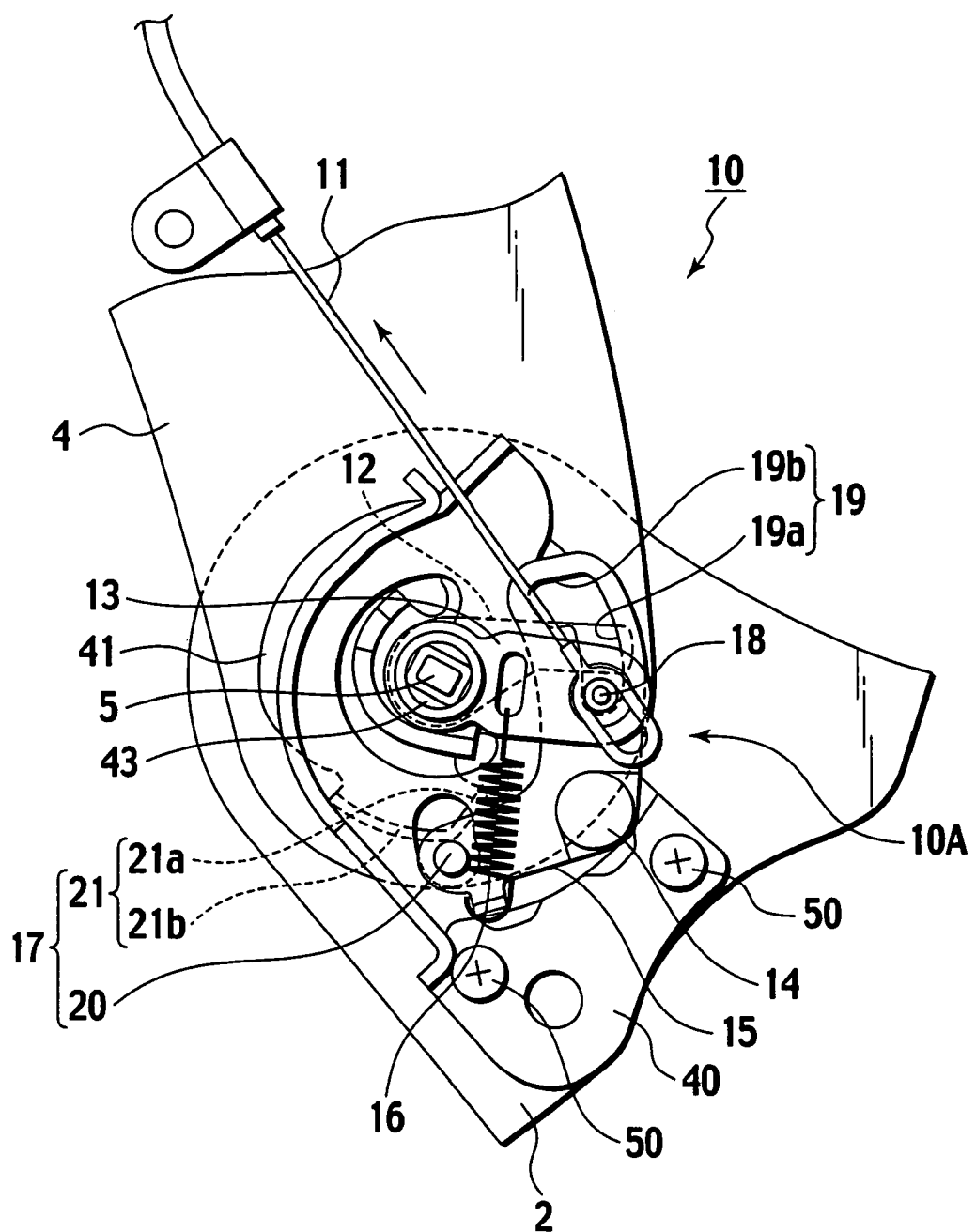
FIG. 9 is a sectional view for explaining operations of a neutral position returning unit and the like according to the embodiment.

Next, an operation of the seat reclining apparatus A will be explained. It is assumed that the seatback 3 is positioned at an arbitrary position in the reclining range. In the reclining lock mechanism 7, the outer peripheral gear of a lock tooth meshes with the inner peripheral gear of an arm circular case by spring forces of the lock springs, thereby the seatback 3 is locked to the seat cushion 1. As shown in FIG. 9, the both folding operation lever 9 and the folding link lever 13 are positioned at the standby position by a spring force of the tension coil spring 16. Since the pin 18 of the folding link lever 13 is positioned in the guide slit 19a, the cam plate 15 is positioned at the lever rotation allowable position against the spring force of the tension coil spring 16.

Figure 10:
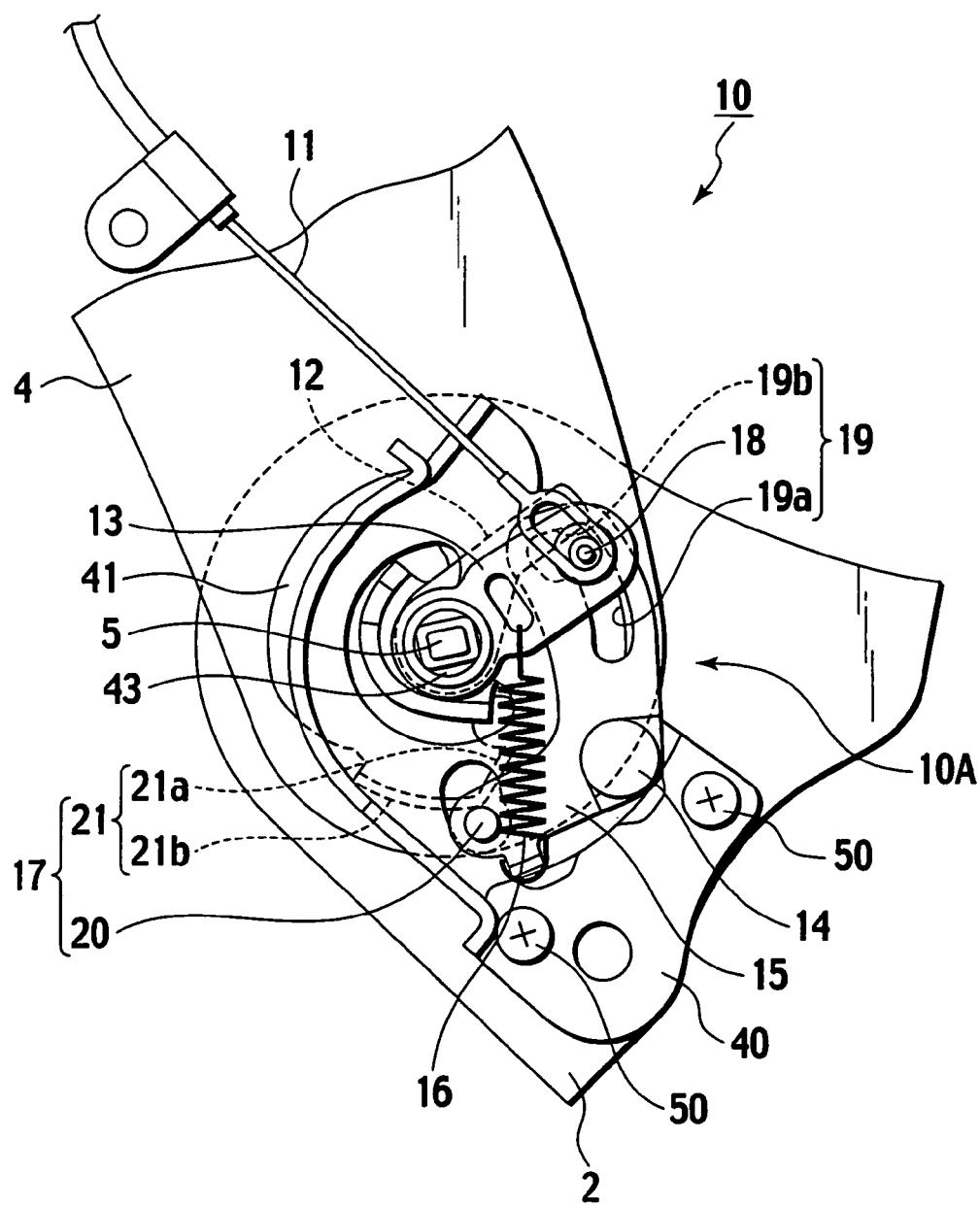
FIG. 10 is a sectional view for explaining an operation of returning to a neutral position according to the embodiment.

In this state, when a user operates the folding operation lever 9 from the standby position to the folding operation position, the cable for folding 11 is pulled in a direction of an arrow in FIG. 9. The folding link lever 13 then rotates in a counterclockwise direction in FIG. 9 against the spring force of the tension coil spring 16. As shown in FIG. 10, the pin 18 rotates the releasing lever 12 while moving upward in the guide slit 19a of the cam plate 15, and the releasing lever 12 rotates from the standby position to the lever rotating position. The reclining lock mechanism 7 is displaced from the lock position to the lock release position according to the rotation of the releasing lever 12. Thereby, the seatback 3 is caused to pivot to the folded position by the biasing force of the spiral spring 6.

Figure 11:
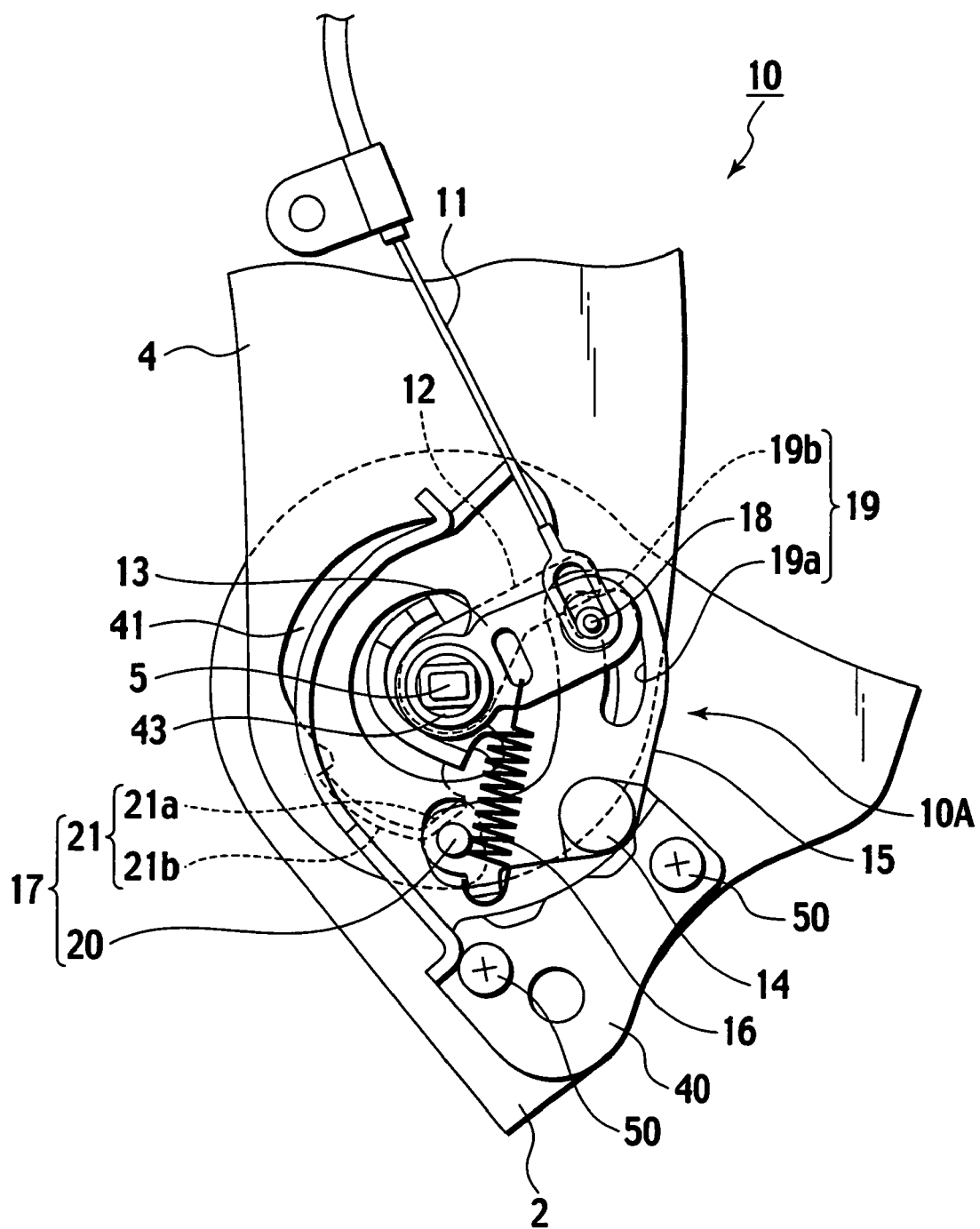
FIG. 11 is another sectional view for explaining the operation of returning to the neutral position according to the embodiment.
Figure 12:
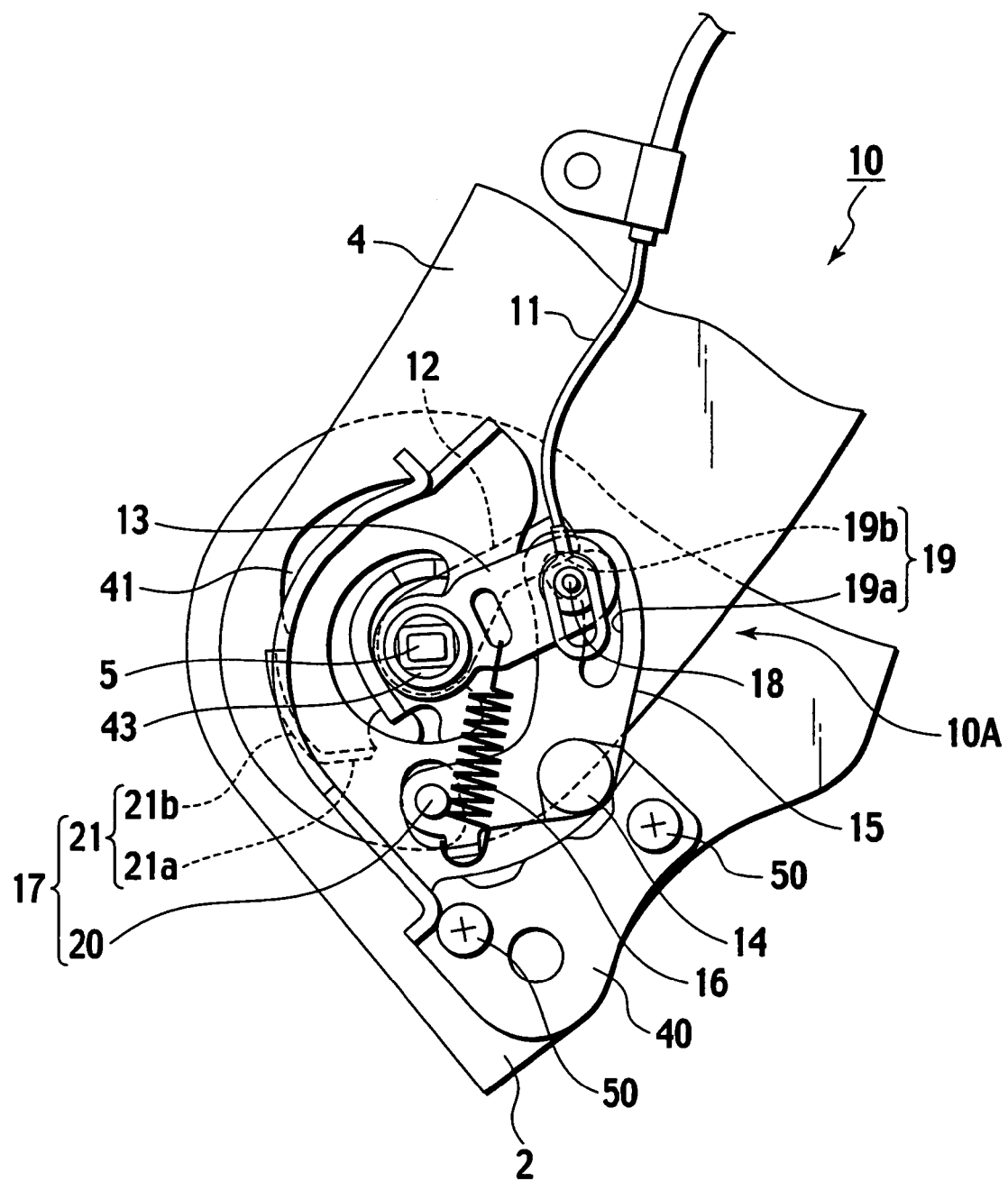
FIG. 12 is still another sectional view for explaining the operation of returning to the neutral position according to the embodiment.

When the folding link lever 13 reaches the lever rotating position, the pin 18 of the folding link lever 13 reaches an upper end of the guide slit 19a of the cam plate 15. As shown in FIG. 11, a contact position of the cam releasing wall 21 and the pin 20 is then changed according to folding of the seatback 3 (the arc-shaped wall portion 21b --> the inclined wall portion 21a --> non-contact). The cam plate 15 rotates around the axial pin 14 in a clockwise direction in FIG. 11 according to the spring force of the tension coil spring 16, and the cam plate 15 rotates to the lever rotation blocking position. The pin 18 of the folding link lever 13 comes into the back of the retaining slit 19b of the cam plate 15. Thereby, the folding link lever 13 is retained at the folding operation position, and the reclining lock mechanism 7 is retained at the lock release position via the releasing lever 12. Thus, as shown in FIG. 12, the seatback 3 is positioned at the folded position, and the reclining mechanism 7 is positioned at the lock release position.

In order to return the seatback 3 positioned at the folded position into a desired reclining range, a user pulls up the seatback 3 against the spring force of the spiral spring 6. When the seatback 3 is pulled up to the neutral position, the inclined wall portion 21a of the cam releasing wall 21 presses the pin 20 of the cam plate 15, as shown in FIG. 13. The cam plate 15 rotates around the axial pin 14 from the lever rotation blocking position to the lever rotation allowable position against the spring force of the tension coil spring 16 according to the pressing force. As a result, the pin 18 of the folding link lever 13 comes into the guide slit 19a of the cam plate 15. The folding link lever 13 is then returned from the lever rotating position to the standby position due to the spring force of the tension coil spring 16. When the folding link lever 13 is returned to the standby position, the releasing lever 12 and the center shaft 5 rotate due to a lock biasing force of the reclining lock mechanism 7 to lock the reclining lock mechanism 7. Thereby, the seatback 3 is locked at the neutral position.

Next, assembling work of the seat memory unit 10 in assembling work of the seat reclining apparatus A will be mainly explained. It is assumed that the seat memory unit 10 is previously assembled into a state shown in FIG. 6 (except for the center shaft 5 and the unit movable base 4). The unit fixing base 40 is preliminarily provided with the cylindrical collar 43 fixing the releasing lever 12, the folding link lever 13, the cam plate 15, and the tension coil spring 16. In assembling of the seat reclining apparatus A, the base bracket 2 and the arm bracket 4 are fixed on the side faces of the reclining lock mechanism 7 by welding or the like, and then, the seat memory unit 10 is assembled.

In assembling of the seat memory unit, the unit movable base 41 of the seat memory unit 10 is fixed on the arm bracket 4 by welding or the like. The unit movable base 41 rotates integrally with the arm bracket 4. Next, the center shaft 5 projecting from the arm bracket 4 is inserted in the cylindrical collar 43 of the seat memory unit 10. Further, the unit fixing base 40 is superimposed on the unit movable base 41, and the base bracket 2 and the unit fixing base 40 are fixed each other with the connection screw 50. The both end portions of the spiral spring 6 are then hooked at the retaining portion 40a of the unit fixing base 40 and the retaining portion 41a of the unit movable base 41, respectively. In assembling process of seat becoming the following step, an end portion of a shaft link rod 5A, and an end portion of the cylindrical collar 43 and each end portion of the center shafts 5 are fixed via each welding portion 51, 52. The base bracket 2 and the unit fixing base 40 can be fixed by a crimp-type pin, instead of the connection screw 50.

Therefore, in the seat reclining apparatus A, since the neutral position returning unit 10A retains or does not retain a position of the releasing lever 12, a simple configuration and a lower production cost can be achieved. The neutral position returning unit 10A retains or does not retain a position of the releasing lever 12 which links the reclining lock mechanism 7 and the folding operation lever 9, and the neutral position returning unit 10A can be provided outside the reclining lock mechanism. Therefore, the seat reclining apparatus A according to the present invention can be provided by a slight design change, and can be easily additionally provided to an existing seat reclining apparatus.

When the seatback 3 is returned to the reclining position, the seatback 3 is returned to a predetermined neutral position regardless of a position of the seatback 3 just before being folded, which is convenient for use. When the seatback 3 has been returned from the folded position into the reclining range, a load from the seatback 3 is applied to the reclining lock mechanism 7, strength management or the like can be reduced.

Since the neutral position returning unit 10A is formed as a seat memory unit 10, assembling thereof to a seat reclining apparatus A is made easier.

In the present embodiment, the folding operation lever 9 displacing the reclining lock mechanism 7 to the lock release position is set separately from the reclining operating lever 8 performing an ordinary reclining operation, and the folding operation lever 9 is retained at the standby position without being operated to the folding operation position when the reclining operation lever 8 is operated to the lock release position. Therefore, the seat memory unit 10 does not be actuated when the reclining operation lever 8 is operated, but the seat memory unit 10 can be actuated only when the folding operation lever 9 is operated. Since the folding operation lever 9 is not displaced at an ordinary reclining operation time by the reclining operation lever 8, an operational force can be reduced, an inertia mass of an operation system can be reduced, and the delay of moving to the lock position of the reclining lock mechanism 7 can be prevented.

The neutral position returning unit 10A according to the present invention includes the releasing lever 12, the folding link lever 13, the cam plate 15, and the cam releasing unit 17. The releasing lever 12 rotates integrally with the center shaft 5 that displaces the reclining lock mechanism 7 between the lock position and the lock release position. The folding link lever 13 is displaced from the standby position to the lever pivoting position against the tension coil spring 16 when the folding operation lever 9 is displaced from the standby position to the folding operation position linking with the folding operation lever 9. The folding link lever 13 rotates together with the releasing lever 12 in this displacement course to displace the reclining lock mechanism 7 from the lock position to the lock release position. When the folding link lever 13 is displaced to the lever pivoting position, the cam plate 15 is displaced from the lever rotation allowable position (where a rotation of the folding link lever 13 is allowed) to the lever rotation blocking position (where a rotation of the folding link lever 13 is blocked) according to the biasing force of the tension coil spring 16. When the seatback 3 is displaced from the folded position side to the predetermined neutral position, the cam releasing unit 17 returns the cam plate 15 from the lever rotation blocking position to the lever rotation allowable position against the biasing force of the tension coil spring 16 to freely rotate the folding link lever 13. Thus, the neutral position returning unit 10A can include the cylindrical collar 43, the releasing lever 12, the folding link lever 13, the cam plate 15, the cam releasing unit 17, and the tension coil spring 16, and it can be achieved with a small number of parts.

Since the releasing lever 12 is fixed on the cylindrical collar 43 rotatably supporting the unit fixing base 40, and the cylindrical collar 43 can be rotated integrally with the center shaft 5, the releasing lever 12 is not required to be provided to the shaft at an assembling step, so that an assembling easiness is favorable.

In the present embodiment, since the folding link lever 13 is rotatable to the cylindrical collar 43, and can rotate independently of the center shaft 5 and the releasing lever 12, the releasing lever 12 and the folding link lever 13 can be disposed about the center shaft 5. Therefore, a configuration of the seat memory unit 10 can be made compact by a high-density disposition of parts.

Since the cylindrical collar 43 and the center shaft 5 are deformation-fitted (or serration-fitted) to each other, it is made possible to rotate the releasing lever and the shaft integrally by only inserting the cylindrical collar 43 into the shaft 5, and positioning of the cylindrical collar and the shaft at insertion is made easier, so that assembling performance can be improved.

In the present embodiment, the cam biasing unit and the lever biasing unit are formed of the single tension coil spring 16 interposed between the folding link lever 13 and the cam plate 15. Therefore, the number of parts can be further reduced, so that simplification of a configuration of the seat reclining apparatus and reduction of production cost thereof can be achieved. The cam biasing unit and the lever biasing unit can be formed of separate springs or the like.

In the present embodiment, the cam releasing unit 17 includes the pin 20 provided to the cam plate 15, and the cam releasing wall 21. The cam releasing wall 21 is moved linking the seatback 3, and when the seatback 3 is displaced from the folded position side to the predetermined neutral position, the cam releasing wall 21 is pressed the pin 20 to displace the cam plate 15 to the lever rotation allowable position.

In the present embodiment, the end portion of the center shaft 5 projecting from the end face of the cylindrical collar 43 and the cylindrical collar 43 are welded and fixed at one end of the shaft link rod 5A. Therefore, the releasing lever 12, the center shaft 5, and the shaft link rod 5A can be integrally rotated without any play. Since a welding work to the center shaft 5 can be performed simultaneously when the shaft link rod 5A and the center shaft 5 are connected, an assembling performance can be improved.

In the present embodiment, the seat memory unit 10 includes the unit fixing base 40, the unit movable base 41, and the cylindrical collar 43. The unit fixing base 40 is fixed to the seat cushion 1. The unit movable base 41 is fixed to the seatback 3. The cylindrical collar 43 is fitted on the center shaft 5 to rotate integrally with the center shaft 5. The releasing lever 12 is fixed to the cylindrical collar 43, and the folding link lever 13 is rotatably supported by the cylindrical collar 43. The cam plate 15 is rotatably supported by the unit fixing base 40, and the cam releasing wall 21 of the cam releasing unit 17 is provided on the unit movable base 41. In this manner, since the seat memory unit is formed as a unit, by inserting the center shaft 5 through the cylindrical collar 43 by, fixing the unit fixing base 40 to the seat cushion 1, fixing the unit movable base 41 to the seatback 3, and rotating the cylindrical collar 43 and the center shaft 5 integrally, assembling of the seat memory unit 10 is completed. Especially, in the present embodiment, since the arm bracket 4 and the unit movable base 41 of the seatback are integrally rotatably fitted to each other by inserting the center shaft 5 through the cylindrical collar 43, it is only required to fix the base bracket 2 and the unit fixing base 40, so that assembling performance becomes remarkably favorable.

While in the present embodiment, the seat memory unit 10 is attached to one of a pair of the left and right reclining lock mechanisms 7, the seat memory unit 10 can be also attached to the both reclining lock mechanisms 7.

What is claimed is:

1. A seat reclining apparatus, comprising:
a folding biasing unit that supports a seatback so as to be capable of reclining the same to a seat cushion, and biases the seatback to a folded position;
a reclining lock mechanism that is displaced between a lock position where the seatback is locked at an arbitrary position within a reclining range and a lock release position where the lock is released, and exerts a lock biasing force at the lock position; and
a folding operation lever which displaces the reclining lock mechanism to the lock release position, wherein
the reclining lock mechanism is displaced from the lock position to the lock release position when the folding operation lever is operated to a folding operation position, and the seatback is displaced to the folded position by a biasing force of the folding biasing unit,
the seat reclining apparatus further comprises
a neutral position returning unit that retains a releasing lever disposed between the folding operation lever operated to the folding operation position and the reclining lock mechanism at the lock release position when the seatback is positioned on the folding side beyond a predetermined neutral position set within the reclining range, and allows movement of the releasing lever to the lock position when the seatback is positioned on a rearward-inclining side beyond the neutral position,
the neutral position returning unit and the releasing lever are formed as a seat memory unit, and
the seat memory unit comprises
a cylindrical collar which is rotatably supported on a unit fixing base fixed on the seatback side or the seat cushion side to rotate integrally with a shaft, the shaft penetrating the cylindrical collar and being capable of displacing the reclining lock mechanism between the lock position and the lock release position,
the releasing lever which is fixed on the cylindrical collar to rotate integrally,
a folding link lever which is rotatably supported on an outer peripheral face of the cylindrical collar which is provided so as to link the folding operation lever provided to an upper portion of the seatback, which is displaced from a standby position to a lever rotating position against a biasing force of a lever biasing unit when the folding operation lever is operated from a standby position to the folding operation position, and which rotates the releasing lever together in this displacement course to displace the reclining lock mechanism from the lock position to the lock release position,
a cam plate which is rotatably supported to the unit fixing base, and which can be displaced between a lever rotation allowable position where rotation of the folding link lever can be allowed and a lever rotation blocking position where rotation of the folding link lever is blocked when the folding link lever is positioned at the lever rotating position,
a cam biasing unit that biases the cam plate to the lever rotation blocking position side, and
a cam releasing unit that displaces the cam plate from the lever rotation blocking position to the lever rotation allowable position against a biasing force of the cam biasing unit when the seatback is displaced from the folded position to the predetermined neutral position and that retains the cam plate at the lever rotation allowable position when the seatback is positioned on the rearward-inclining side beyond the neutral position.

2. The seat reclining apparatus according to claim 1, wherein the folding link lever is fixed on a swinging central color rotatably supported, with axial direction movement thereof being restricted, on the outer peripheral face of the cylindrical collar, and the shaft and the releasing lever are supported so as to rotate independently.

3. The seat reclining apparatus according to claim 1, wherein the cylindrical collar and the shaft inserted into the cylindrical collar can rotate integrally by deformation-fitting or serration-fitting.

4. The seat reclining apparatus according to claim 1, wherein the reclining lock mechanisms are disposed on both left and right sides of the seat cushion, the shafts of both the reclining lock mechanisms are connected to each other by a connection member, and an end portion of the shaft projecting from an end face of the cylindrical collar and the cylindrical collar are welded and fixed on one end of the connection member.

5. The seat reclining apparatus according to claim 1, wherein the seat memory unit comprises
a unit fixing base fixed to the seat cushion,
a unit movable base fixed to the seatback, and
the cylindrical collar through which the shaft is inserted, and which rotates integrally with the shaft, and wherein
the releasing lever is fixed on the cylindrical collar, the folding link lever is rotatably supported on the cylindrical collar, the cam plate is rotatably supported on the unit fixing base, and a cam releasing wall which displaces or retains the cam plate is provided on the unit movable base.

* * * * *